United States Patent [19]

Chin

[11] Patent Number: 4,560,337

[45] Date of Patent: Dec. 24, 1985

[54] HIGH-SPEED FOOD PRODUCT FORMING APPARATUS

[75] Inventor: Joseph T. Chin, Elmhurst, N.Y.

[73] Assignee: DCA Food Industries, Inc., New York, N.Y.

[21] Appl. No.: 568,088

[22] Filed: Jan. 4, 1984

[51] Int. Cl.[4] ............................................. A21C 11/16
[52] U.S. Cl. .................................... 425/288; 425/298
[58] Field of Search ..................... 425/287, 288, 298

[56] References Cited

U.S. PATENT DOCUMENTS

| | | | |
|---|---|---|---|
| 2,023,658 | 12/1935 | Ahacich | 425/287 |
| 2,166,260 | 7/1939 | Mosher | 425/288 |
| 3,126,842 | 3/1964 | Belshaw | 425/287 |
| 3,947,178 | 3/1976 | Belshaw et al. | 425/287 |
| 4,233,016 | 11/1980 | Chin et al. | 425/287 |

Primary Examiner—Willard E. Hoag
Attorney, Agent, or Firm—Philip H. Gottfried

[57] ABSTRACT

A high-speed forming apparatus for rapidly forming a plurality of food products from a food product mixture or slurry discharged from a nozzle orifice wherein said food products attain a desired shape, e.g., a section of a right cylinder. The device is mountable on the nozzle of a food product forming apparatus and enables a liquid substance to be uniformly directed against each of radially inner and radially outer forming surfaces to envelop them and to aid in the release of the formed food products from the apparatus.

3 Claims, 5 Drawing Figures

U.S. Patent    Dec. 24, 1985    4,560,337
FIG. 1. (PRIOR ART.)
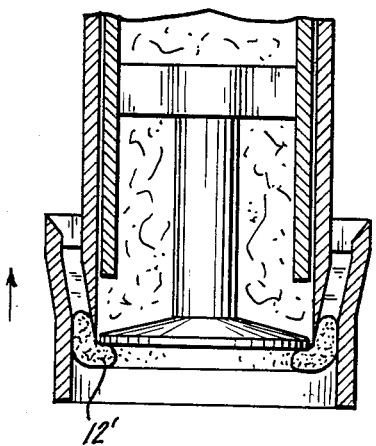
FIG. 2.
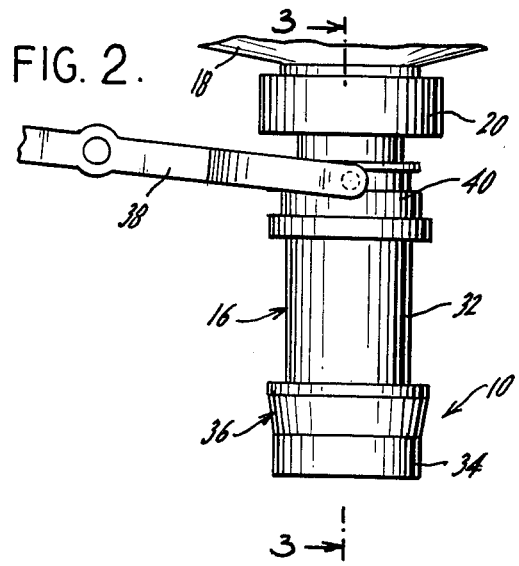
FIG. 3.
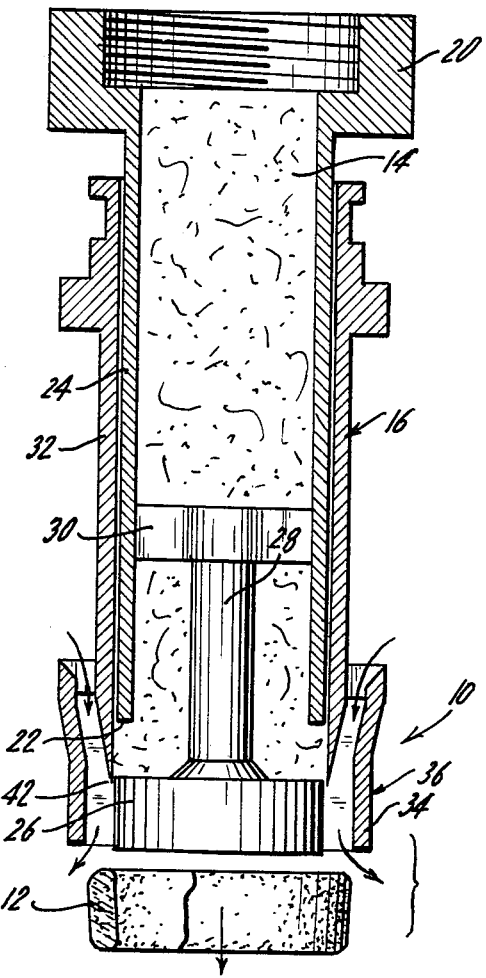
FIG. 4.
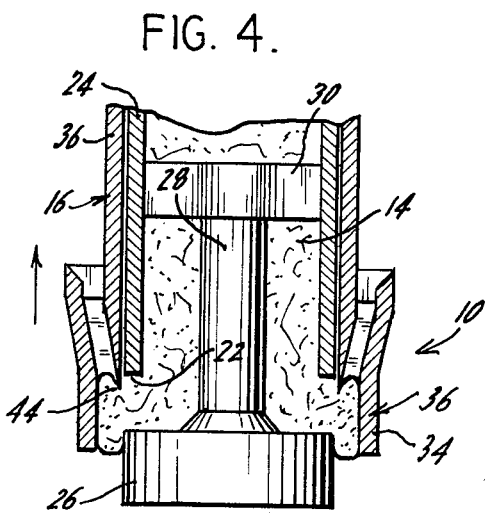
FIG. 5.
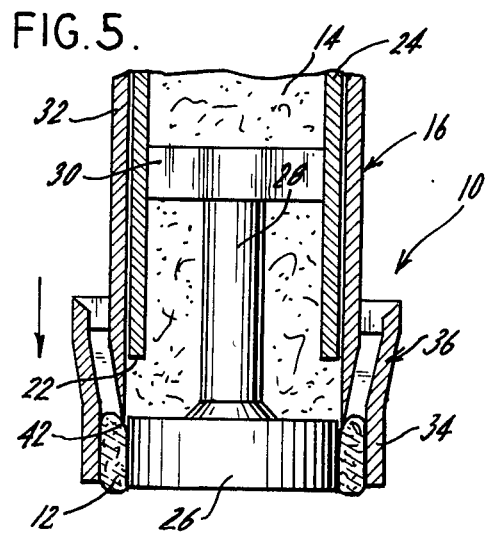

HIGH-SPEED FOOD PRODUCT FORMING APPARATUS

The present invention relates generally to apparatus for shaping food products and more particularly to a forming device which can be mounted adjacent to a nozzle orifice through which slurries or mixtures of a food product are discharged by a food product apparatus and still more particularly to apparatus permitting high-speed formation of food products in desired shapes.

It is known in the art to provide a molding or forming member adjacent to a nozzle orifice through which a food mixture is discharged so as to form the mixture into a particular shape prior to its being further processed, such as by being fried. For example, U.S. Pat. No. 1,866,061 shows a donut forming device. In addition, U.S. Pat. No. 3,452,687 shows an apparatus for molding a filled dough mixture by way of a pair of movable, split molding bowls. The bowls are brought together in the vicinity of a discharge opening in a pipe to receive the mixture and aid in its molding and removal from adjacent the opening. The molding cups themselves are substantially curved or bent so that their edges closely encircle a cutting sleeve mounted about the pipe, the bowls being moved up and down along the sleeve by outside means during the dough-forming and removal operations and move apart to discharge the formed dough product.

The forming devices described hereinbefore are intended and designed to provide toroid-shapped dough products having a generally circular cross-section. However, with the increasing popularity of food products composed of mixtures or slurries of elemental food pieces, such as diced onions, there has arisen a need for a forming device which can be used in association with a food product forming apparatus that will form, from slurries of mixtures of food products, other than toroid or donut-shaped food products in order to more closely simulate natural-appearing final products.

In the case of onion rings formed from an onion mash, it is highly desirable that the cross-section of the final onion ring product be rectangular or approach the appearance of a segment of a right cylinder rather than be curved so as to more closely resemble a segment of a natural sliced onion ring which is generally in the shape of a segment of a right cylinder. It will be appreciated that none of the donut-forming devices mentioned hereinbefore could be satisfactorily used to provide such walls on food products discharged in slurry form from a nozzle opening and still enable an easy release of the formed product away from the nozzle. For example, the devices of the known prior art, such as that disclosed in U.S. Pat. No. 3,814,560, provides onion ring products from a slurry of onion mash wherein onion mash slurry is discharged from an opening at the base of a nozzle and impinges on a cutter disc which extends laterally of the nozzle base thereby directing the mash outwardly and sideways from an opening between the cutter disc and a cutter sleeve. A liquid gell-forming substance is directed down along the side of the cutting sleeve to envelop each of the discharged food products formed from the slurry as they are cut free by the coaction between the cutter sleeve and the cutter disc. However, the food products formed by this apparatus are generally circular in cross-section and do not provide the desired natural-appearing food products which approximate a segment of a right cylinder.

An attempt at overcoming the shortcomings in the prior art food product forming apparatus providing only circular cross-section food products was disclosed in U.S. Pat. No. 4,233,016. The apparatus disclosed in the '016 patent provided a food product having substantially cylindrical inner and outer sidewalls thereby yielding a shape more typical of that of the natural food. However, in view of the fact that it is generally necessary to operate food forming apparatus at relatively high speeds in order to produce a natural-appearing food product that can be offered for sale and sold at a price which is attractive to purchasers thereof, certain deficiencies were discovered in the high-speed operation of such prior art apparatus. Specifically, when operated at high speed, the food product which was formed did not retain its desired shape approximating very closely that of a segment of right cylinder. Rather, instead of approximating a rectangle in cross-section, the formed food product assumed a cross-sectional shape of a capital letter "L" thereby defeating the basic object of the apparatus when the same was operated at commercially-required speeds.

It is an object of the present invention to overcome the above and other shortcomings in prior art food product forming apparatus.

It is another object of the present invention to provide a food product forming apparatus capable of rapidly providing a series of formed food products manufactured from food product slurries which have a desired shape closely approximating that of a natural food product and particularly being segments of right cylinders.

It is yet another object of the present invention to provide a food product forming apparatus which can be mounted to a nozzle through which a slurry or mixture of the food product is discharged and which can be operated at commercially economical speeds.

It is a still further object of the present invention to provide a food product forming device capable of rapid operation for use with apparatus of the type in which a liquid substance is directed against the apparatus to impinge upon successively discharged food product slurries without impairment of the operation of the apparatus.

In accordance with the present invention there is provided a high-speed food product forming apparatus of the type which includes a nozzle having an axial bore extending longitudinally therethrough for the conduct of a slurry of said food product delivered at one, upstream end of said nozzle to an orifice at the other, downstream end of said nozzle. The orifice is constructed and arranged for radially outwardly discharging given amounts of the slurry and a full-product-contact forming apparatus is constructed and arranged to have both radially inner and radially outer forming surfaces. The radially outer forming surface is located on a sleeve having an axis which is generally aligned to be coaxial with the axial bore of the nozzle and is constructed and arranged in spaced-apart relationship with the orifice for forming a corresponding outer wall on the exteriors of each of a plurality of successive amounts of discharged slurry. The forming device further comprises a radially inner forming surface which is located on a cutter member which is located downstream of the orifice and which is generally aligned coaxially with the axial bore of the nozzle. There are means which mount the sleeve including the radially outer forming surface for movement in an axial direction relative to the orifice. The sleeve and the radially outer forming surface are constructed and arranged to continuously maintain the radially outer forming surface in confronting relation to the orifice during axial movement thereof. The radially inner forming surface is constructed and arranged to form the radially inner surface of the food product upon the radially outer forming surface moving axially relative thereto and a discharged amount of said foodstuff slurry likewise moving axially downstream relative thereto. The radially inner forming surface is of an axial extent at least substantially equal to the axial extent of the formed foodstuff. The radially inner and the radially outer forming surfaces are constructed and arranged to be substantially unobstructed in a direction parallel to the region axially above and below the orifice. The full-product-contact forming apparatus is further constructed and arranged so that the formed food product is substantially entirely contained between the radially inner and the radially outer forming surfaces during the formation of the inner and outer walls thereof with the formed food product being unobstructed and free to be discharged from said high-speed forming apparatus in the axial direction upon closing of the orifice and completion of the formation of the food product.

The above brief description, as well as further objects, features, and advantages of the present invention will be more fully understood by reference to the following detailed description of a presently preferred but, nonetheless, illustrative embodiment in accordance with the present invention, when taken in conjunction with the accompanying drawing, wherein:

FIG. 1 is a partial elevational cross-sectional view of a nozzle and forming device of the prior art;

FIG. 2 is a reduced-size right elevational view showing a nozzle extending from a food product apparatus and showing a forming device of the present invention mounted on the nozzle to provide food products which are substantially segments of right cylinders, in accordance with the present invention;

FIG. 3 is a partial cross-sectional view of a nozzle and forming device of the present invention taken substantially along the Line 3—3 of FIG. 2 and looking in the direction of the arrows showing the food product slurry conducted through the nozzle toward a discharge orifice at the base of the nozzle, the nozzle being closed off by a cutter member with a typical formed food product comprising a section of a right cylinder being shown in partial cross-section therebeneath;

FIG. 4 is a view of the lower portion of the nozzle of FIG. 3 and similar thereto, showing the cutter sleeve in the forming device in an upward-moving position whereat the slurry is being discharged through the nozzle orifice against the radially outer forming device in accordance with the present invention; and, FIG. 5 is a view similar to FIG. 4 showing the cutter sleeve and forming device in a downward position to sever the formed food product from the apparatus of the present invention and showing the formed food product between the radially inner and outer forming surfaces during the formation of the respective outer and inner walls thereof and in a position to be axially released from the food forming apparatus.

Referring now specifically to the drawing and initially to FIGS. 2 and 3, there is shown a typical food product forming device in accordance with the present invention generally designated by the reference numeral 10 for providing food products 12 which are substantially segments of right cylinders formed from food product slurries or mixtures 14 which are delivered to a nozzle 16. The nozzle 16 has food slurry 14 delivered to it at one, upstream, end, from a supply hopper 18 (see FIG. 2) which is in communication therewith by being threadably engaged therewith by way of an internally threaded collar 20. Predetermined quantities of said food slurry 14 are successively discharged from the nozzle 16 through an opening or orifice 22 in the lower, downstream, end thereof which is formed between the bottom, downstream end of an inner tubular member 24 and the upsteam end of a combination cutter/forming member 26 which is removably fixed to the inner tubular member 24 through the office of stalk 28 and cross-member 30. Consequently, the discharge opening or orifice 22 is bounded by the bottom, or downstream, edge of the tubular member 24 and the upstream surface of the cutter/forming member 26 which is, in the preferred embodiment shown, a segment of a right cylinder. Similarly, in the preferred embodiment shown, the nozzle 16 includes a cutter sleeve 32 coaxially fixed to slide over the tubular member 24. The lowermost or downstream segment 34 is the termination of sleeve-like member 36. The radially inner wall thereof comprises a radially outer forming surface in a manner to be described in greater detail hereinafter.

The sleeve 32 is reciprocally movable over the tubular member 24 by way of a pivoted rocker arm 38 (see FIG. 2) which is itself pivotably engaged with a grooved collar 40 formed about the upper end of the cutter sleeve 32. The cutter sleeve 32 includes an inwardly tapered lower cutting edge 42 (see FIG. 3) which operates to sever predetermined amounts of the food slurry 14 when the same is discharged through the orifice 22 in response to pressure transmitted from the supply hopper 18 so that formed food products 12 can be released from the nozzle, as may be seen by comparing FIGS. 3, 4, and 5. Accordingly, it will be understood that when the cutter sleeve 32 is an upward position (FIG. 4), the food slurry 14 is free to be discharged radially outwardly through the orifice 22 in response to pressure transmitted through the supply hopper 18 to the food slurry 14 through the inner tubular member 16. When the cutter sleeve is moved downwardly (see FIG. 5), its cutting edge 42 (which is at the lowermost or downstream end thereof), severs the slurry within the nozzle 16 and separates it from the remainder of the food slurry 14 within the nozzle body and the axially unobstructed construction of the apparatus permits the formed food product 12 to freely move axially away from the apparatus to be further processed.

The sleeve-like member 36 includes an upper portion which is upwardly and outwardly tapered and which is non-cylindrical in either its inner or outer configurations (unlike the lower portion thereof which is right-cylindrical at least in its inner configuration) for a purpose to be described hereinafter and is securely, although at least in one embodiment thereof, removably joined to the cutter sleeve 32 by one or more spacer elements (not shown) which are utilized to fix the sleeve-like member 36 to the outside of the cutter sleeve 32.

The axial extent of the right-cylindrical downstream segment 34 of the sleeve-like member 36 is selected to be substantially equal in axial extent to the desired axial extent of the food product 12 to be formed thereby and is radially spaced outwardly an amount from the orifice 22 which is chosen to approximate the thickness of the formed food product. Further, the arrangement of the generally right-cylindrical inner configuration of the downstream segment 34 of the sleeve-like member 36 (the so-called radially outer forming surface) is mounted to the cutter sleeve 32 and is reciprocated relative to the tubular member 24 so that at least a portion of the radially outer forming surface continually confronts the orifice 22 when the same is uncovered by the cutter sleeve 32.

The cutter/forming member 26 performs a dual function. In conjunction with the cutting edge 42 of the cutter sleeve 32, at its upstream edge, it cuts off the supply of food slurry 14 to the region between the interior of the tubular member 24 and the radially outer forming surface of the sleeve-like member 36 and also performs the function of, through its radially outermost surface, acting as a radially inner forming surface for the forming of a food product 12 (compare FIGS. 3, 4, and 5) all in a manner to be described in greater detail hereinafter.

The operation of the food forming device 10 will now be described particularly with reference to FIGS. 3, 4, and 5 of the drawing.

FIG. 3 illustrates both the beginning and ending of a cycle of operation of the apparatus wherein a food product 12 of a configuration generally approximating that of a section of a right cylinder has been formed by high-speed operation of the subject apparatus. The deviation which may exist between a true segment of a right cylinder and the shape which is formed by the subject apparatus is primarily only due to the plasticity of the material of which the food slurry 14 is composed.

In order to aid in the release of a formed food product 12 in the axial direction as shown by the arrow thereon in FIG. 3, particularly where the food product slurry 14 is composed of a product such as an onion mixture including a gell-forming material (such as sodium alginate, for example), a liquid wash of a gell-forming-/release agent (such as calcium chloride for reacting therewith) may be continuously supplied to the radially outwardly opening upper segment of the sleeve-like member 36 (as shown by the curved arrows in FIG. 3 thereat). This wash, when not blocked from so doing by the appearance therein of a forming food product, can flow freely through the sleeve-like member 36 and can and does lubricate and partially adhere to both the radially outer forming surface and the radially inner forming surface. The wash is thereby permitted to contact the extruding food slurry 14 to both form a skin thereon and permit the release thereof in an axial direction from the subject apparatus upon completion of the cutting action of the tapered cutting edge 42 of the cutter sleeve 32 when the same makes contact with the upstream edge of the cutter/forming member 26 (compare FIGS. 3 and 5).

As the cutter sleeve 32 and the sleeve-like member 36 affixed thereto move upwardly from the position thereof shown in FIG. 3 toward the position shown in FIG. 4, the orifice 22 is uncovered and food slurry 14, in virtue of the pressure being exerted thereon, begins to extrude radially outwardly through the orifice 22 and impinges upon the radially outer forming surface of the downstream segment 34 of the sleeve-like member 36 (see FIG. 4). A certain, lesser amount of the extruding slurry will likewise extrude downwardly out of the the orifice 22 and will impinge upon the radially inner cutter/forming surface of the forming member 26. Once the desired amount of food slurry 14 has been extruded through the orifice 22, the cutter sleeve 32 along with the attached sleeve-like member 36 moves downwardly until it reaches the position shown in FIG. 5 wherein the lower cutting edge 42 of the cutter sleeve 32 coacts with the upper edge of the cutter/forming member 26 to completely close off the orifice 22 and the communication of the food slurry 14 remaining therein with the region outside of the tubular member 24 as shown in FIG. 5.

The axial extent of the inner forming surface of the cutter/forming member 26 has been chosen to be substantially coextensive with the desired final axial extent of the formed food product 12 so that the food product 12 when being formed is substantially continuously retained between the radially inner and radially outer forming surfaces. Such configuration permits high-speed operation of the apparatus of the present invention to form final products which are substantially sections of right cylinders as shown most clearly in FIG. 3 without permitting the same to assume a generally "L"-shaped cross-sectional configuration as shown in the prior art apparatus of FIG. 1 wherein the food product 12 has been formed by high-speed operation of the prior art apparatus shown therein has assumed a shape which is wholly unlike any natural-appearing food product and which is therefore unacceptabe from an aesthetic or commercial point of view.

While the actual speed of operation of the subject apparatus will vary depending upon the actual shapes to be formed thereby (shapes other than sections of right cylinders being possible provided that appropriate configurations are chosen for the cooperating apparatus and forming surfaces), further depending upon the material of which the food slurry 14 is composed and the viscosity thereof, still further depending upon the pressure placed on the food slurry 14 and the rapidity with which the subject apparatus is to be operated, in a preferred form of the subject apparatus, acceptable-shaped products were formed which closely approximated sections of right cylinders at a rate of one hundred and eighty (180) cuts per minute under a pressure of fifteen pounds per square inch on the food slurry 14. This production rate was substantiallly in excess of the acceptable-shape production which was achievable without the subject invention. It is anticipated that with appropriate selection of variable parameters, a range of between 50 and 250 products per minute could be accomplished with the subject apparatus, with the possibility existing of an even higher range of operation. With products of different diameters, as well as with different viscosity food slurries and different operating pressures, the axial extent may be varied of either or both of the inner and outer forming surfaces. Still further variable is the distance from the bottom edge of the cutting edge 42 to the bottom of the cutter member which, in preferred embodiments, has been as little as a quarter of an inch for a ring diameter of one and five eights inch and has been one half inch for ring diameters between one and three quarters and two inches.

As will be readily apparent to those skilled in the art, the present invention may be realized in other specific forms without departing from its spirit or essential characteristics. The present embodiment is, therefore, to be considered as illustrative and not restrictive, the scope of the invention being indicated by the claims rather than by the foregoing description, and all changes which come within the meaning and range of equivalence of the claims are therefore intended to embraced therein.

What is claimed is:

1. In a high-speed food product forming apparatus of the type which includes a nozzle having an axial bore extending longitudinally therethrough for the conduct of a slurry of said food product delivered at one, upstream, end of said nozzle to an orifice at the other, downstream, end of said nozzle, said orifice being constructed and arranged for radially outwardly discharging given amounts of said slurry, the improvement comprising a forming apparatus constructed and arranged to have radially inner and radially outer forming surfaces, said radially outer forming surface being located on a sleeve having an axis being generally aligned coaxially with the axial bore of said nozzle and being constructed and arranged in spaced-apart relationship with said orifice for forming a corresponding outer wall on the exterior of said given amounts of discharged slurry, said forming apparatus further comprising a radially inner forming surface for forming a radially inner wall on the interior of said food product, said radially inner forming surface being located on a cutter member and being located downstream of said orifice and generally aligned coaxially with the axial bore of said nozzle, means mounting said sleeve including said radially outer forming surface for movement in an axial direction relative to said orifice, said sleeve and said radially outer forming surface being constructed and arranged to continuously maintain said radially outer forming surface in confronting relation to said orifice during said axial movement, said radially inner forming surface being constructed and arranged to form the radially inner surface of said food product upon said radially outer forming surface moving axially relative thereto and discharged amounts of said foodstuff slurry likewise moving axially downstream relative thereto, said radially inner forming surface being of an axial extent at least substantially equal to the axial extent of said formed foodstuff, said radially inner and said radially outer forming surfaces being constructed and arranged to be substantially unobstructed in a direction parallel to said region axially above and below said orifice, said forming apparatus being further constructed and arranged so that said formed food product is substantially entirely contained between said radially inner and outer forming surfaces during the formation of the inner and outer walls thereof, said formed food product being unobstructed and free to be discharged from said high speed forming apparatus in said axial direction upon closing of said orifice and completion of the formation of said food product.

2. The forming apparatus of claim 1 for high-speed forming of right-cylindrical section food products, said cutter member being a section of a right cylinder and said radially outer forming surface being a section of a right cylinder.

3. The forming apparatus of claim 1, said radially outer forming surface including an upstream, contiguous outwardly-directed radially outer surface constructed and arranged to direct a liquid substance provided thereto upstream of said surface to both said radially outer forming surface and to said radially inner forming surface prior to said orifice discharging said given amounts of said slurry thereby permitting said radially inner and outer surfaces of said food product slurry to contact liquid remaining on said radially inner and outer forming surfaces.

* * * * *